United States Patent
Hoffner et al.

(10) Patent No.: US 10,360,207 B2
(45) Date of Patent: Jul. 23, 2019

(54) DATABASE TRIGGER-BASED EVENTING FOR DATA CHANGES BASED ON A PUBLISH/SUBSCRIBE MECHANISM

(71) Applicant: SAP SE, Walldorf (DE)

(72) Inventors: Andreas Hoffner, Östringen (DE); Henrike Schuhart, Wiesloch (DE); Dirk Sabiwalsky, Sandhausen (DE); Joerg Singler, Zeutern (DE)

(73) Assignee: SAP SE, Walldorf (DE)

( * ) Notice: Subject to any disclaimer, the term of this patent is extended or adjusted under 35 U.S.C. 154(b) by 287 days.

(21) Appl. No.: 15/344,088

(22) Filed: Nov. 4, 2016

(65) Prior Publication Data
US 2018/0129694 A1   May 10, 2018

(51) Int. Cl.
| | |
|---|---|
| G06F 17/30 | (2006.01) |
| G06F 16/23 | (2019.01) |
| G06F 16/22 | (2019.01) |
| G06F 9/54 | (2006.01) |

(52) U.S. Cl.
CPC ............ *G06F 16/2358* (2019.01); *G06F 9/54* (2013.01); *G06F 16/2282* (2019.01)

(58) Field of Classification Search
None
See application file for complete search history.

(56) References Cited

U.S. PATENT DOCUMENTS

| | | | | |
|---|---|---|---|---|
| 2014/0229435 | A1* | 8/2014 | Palivatkel | G06F 17/30575 707/620 |
| 2016/0055222 | A1* | 2/2016 | Sarferaz | G06F 17/30587 707/603 |
| 2017/0039521 | A1* | 2/2017 | Henke | G06Q 10/103 |
| 2018/0011655 | A1* | 1/2018 | Gredler | G06F 3/067 |

* cited by examiner

*Primary Examiner* — Debbie M Le
(74) *Attorney, Agent, or Firm* — Mintz Levin Cohn Ferris Glovsky and Popeo, P.C.

(57) ABSTRACT

Methods and apparatus, including computer program products, are provided for handling database table changes. The method may include receiving, at an event processor, a request from an application to subscribe to a database table event at an in-memory database; storing, at the event processor, a subscription to the database table event; sending, by the event processor, a subscription request to the in-memory database, wherein the subscription request indicates a subscription to the database table event; handling, at the event processor, a notification, wherein the notification is received on behalf of the application in order to determine whether to publish the notification to an endpoint coupled to at least the application, wherein the notification indicates an identity of at least one database table at the in-memory database that has changed; and publishing the notification to the endpoint. Related systems, methods, and articles of manufacture are also disclosed.

16 Claims, 3 Drawing Sheets

300

Receive, at an event processor, a request from an application to subscribe to database table events at an in-memory database 310

Store, at the event processor, a subscription to a database table event 320

Send, by the event processor, a subscription request to the in-memory database, wherein the subscription request indicates a subscription to the database table event 330

Handle, at the event processor, a notification on behalf of the application 340

Publish the notification to the endpoint. 350

FIG. 3

DATABASE TRIGGER-BASED EVENTING FOR DATA CHANGES BASED ON A PUBLISH/SUBSCRIBE MECHANISM

FIELD

The subject matter described herein generally relates to monitoring cloud-based applications.

BACKGROUND

Some programs, databases, and application servers, including SAP's ABAP for example, may utilize a polling-based approach to check for updates in the database. For example, a client-centric user interface application, such as a SAP Fiori application, may poll a system, such as an in-memory database, to obtain data updates such as changes, deletions, additions, and/or the like to the stored data. Specifically, a polling based approach may be used to detect any data changes in the underlying stored data in the database tables.

SUMMARY

In some implementations, methods and apparatus, including computer program products, are provided for handling database table changes.

In some embodiments, there is provided a method. The method may include receiving, at an event processor, a request from an application to subscribe to a database table event at an in-memory database; storing, at the event processor, a subscription to the database table event; sending, by the event processor, a subscription request to the in-memory database, wherein the subscription request indicates a subscription to the database table event; handling, at the event processor, a notification, wherein the notification is received on behalf of the application in order to determine whether to publish the notification to an endpoint coupled to at least the application, wherein the notification indicates an identity of at least one database table at the in-memory database that has changed; and publishing the notification to the endpoint.

In some example embodiments, one of more variations may be made as well as described in the detailed description below and/or as described in the following features. A cloud-based application providing resource control may include the event processor. The resource control may include supply chain management and/or human resource management. A user equipment may include the application and couples to the cloud-based application. The event processor may receive the notification sent by the in-memory database. The event processor may include an event broker configured to read the notification and read whether the notification includes the at least one database table under a subscription request from the application. When a change to the at least one database table is committed, an after commit handler at the database may trigger a database notification handler to determine whether the event processor subscribes, on behalf of the application, to the change. When the determination indicates the event processor subscribes, on behalf of the application, to the change, the database notification handler may send the notification to the event processor. The event processor may store subscriptions to a plurality of database table events provided by a plurality of applications including different types of applications. The publishing may include sending, by the event processor, a list of database tables that have changed at the in-memory database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 3 depicts an example of a process for cloud application monitoring, in accordance with some example implementations.

DETAILED DESCRIPTION

As noted, some programs, databases, and application servers, including SAP's ABAP for example, may utilize a polling-based approach to check for updates in the database. However, a polling-based approach may not be useable in all situations and/or may not satisfy the performance needs of some applications.

In some implementations, there may be provided a table event processor configured to publish, via endpoints, to consumers such as applications a list of one or more database tables that have been updated at a database.

Figure 1:
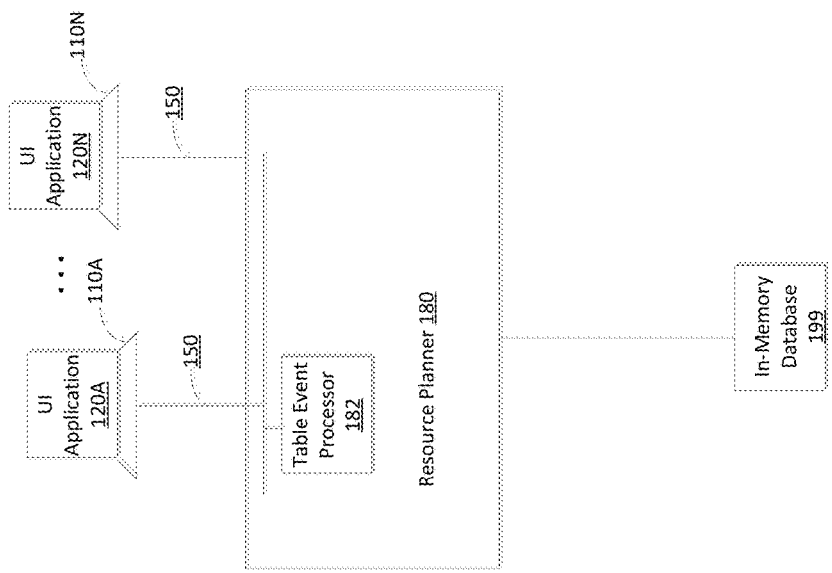
FIG. 1 illustrates a block diagram of a cloud application monitoring service, in accordance with some example implementations.

FIG. 1 depicts an example system 100, in accordance with some example implementations.

The system 100 may include one or more user equipment 110A-N each including a user interface 120A-N. The user equipment may be implemented as at least one processor and at least one memory including code or instructions; examples of user equipment include a computer, a smart phone, a tablet computer, a wireless Internet of Things (IoT) sensor or device, and/or the like.

The user interface 120A-N may each access via the Internet 150 a system such as resource planner 180. The user interface may be implemented as a browser, a client application, a user interface, and/or any other interface that enables interaction with and/or access to resource planner 180.

The resource planner 180 may be implemented to provide one or more functions including enterprise resource planning functions related to control, planning, and/or the like, examples of which include SAP S/4 HANA, ABAP, and/or other type of applications, services, or programs. Moreover, the resource planner may interface with other systems, such as databases and/or the like. In the example of FIG. 1, the resource planner may access a database, such as in-memory database 199. An example of an in-memory database is SAP HANA, although other types of databases and in-memory databases may be accessed as well.

In some implementations, resource planner 180 may be implemented as a cloud-based application, although the resource planner may be implemented as an on premise application as well. The resource planner may include at least one processor and at least one memory including instructions to provide resource planning and other features as disclosed herein.

To illustrate further, resource planner 180 may correspond to for example a cloud-based supply chain management (SCM) system, a leave or vacation processing system, and/or the like. When this is the case, the user equipment 110A may include user interface application 120A (e.g., SAP Fiori and/or other type of application) to access the resource planner 180 in order to control the supply-chain, process employee leave requests, and/or the like. The resource planner 180, as part of its function of supply chain management or processing vacation/leave requests for example, may access (e.g., call and/or the like) other applications and/or services including databases such as in-memory database 199. As noted above, as changes occur in the database 199, these changes may need to be provided to resource planner 180 and other systems such as user interfaces 120A-N, consumers, services, applications, and/or the like.

To that end, in some implementations, there is provided a table event processor 182 that is configured to allow other systems to subscribe to changes in database 199. When a change occurs in database 199, the table event processor 182 may then determine whether any of its subscribers, such as user interface 120A-N and/or the like, have subscribed to that change, and, if so, the table event processor 182 may push, via one or more channels, to consumers an indication of which database tables at database 199 have changed.

Figure 2:
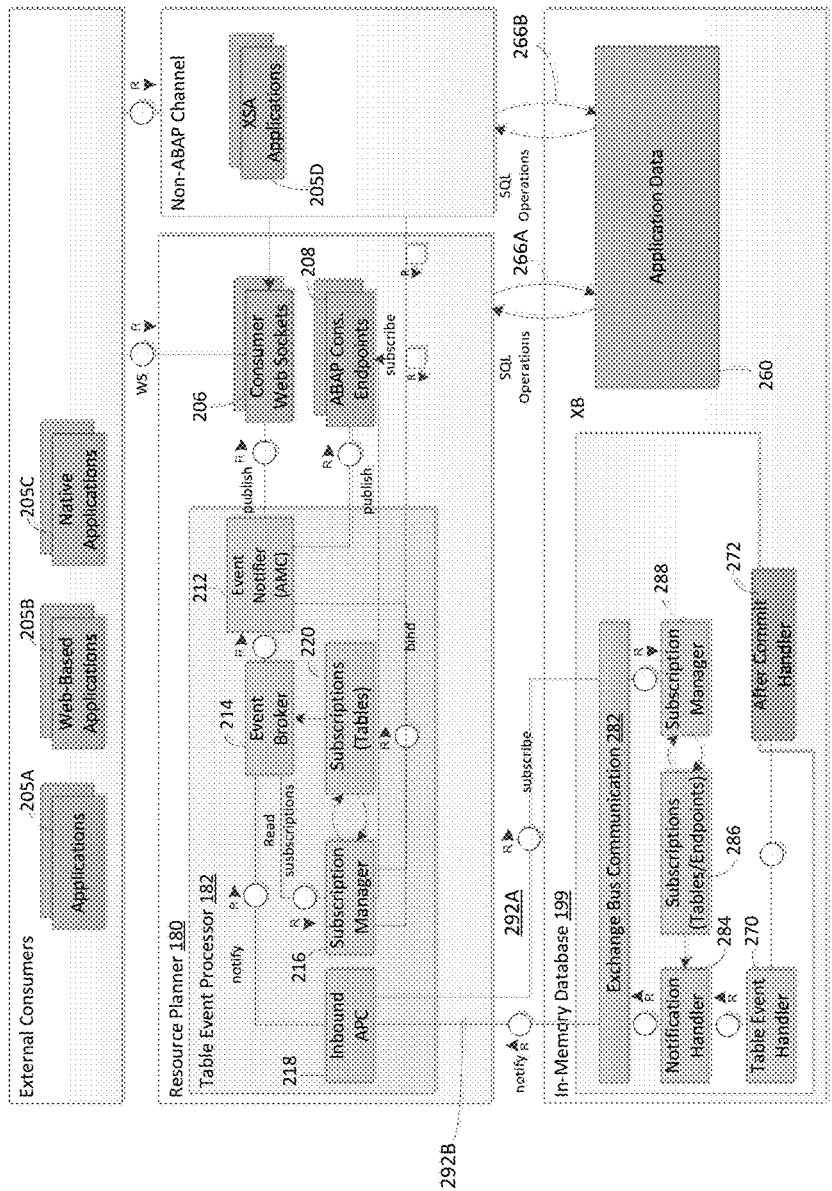
FIG. 2 illustrates a block diagram of another example of a cloud application monitoring service, in accordance with some example implementations.

FIG. 2 depicts an example system 200 that is similar in some respects to system 100 but includes additional features as described further below.

The system 200 may include applications 205A-D, which may access other systems, services, and/or programs, such as resource planner 180. The applications 205A-D may couple to the resource planner 180 via a web socket 206 or via other types of endpoints, such as more specialized endpoints such as an ABAP endpoint 208. In the example of FIG. 1, the applications 205A-D include web-based applications, native applications, and/or other types of applications, such as via SAP's XS advanced (XSA) application 205C. XSA 205C provides an application server for native development of applications and includes an application router to route browser requests to relevant applications. The applications 205A-D may also include user interface applications 120A-N as well as any other type of application including service that may require updated data from database 199.

The resource planner 180 may include table event processor 182 configured to publish, via endpoints 206-208, to consumers such as applications 205A-D a list of one or more database tables that have been updated at database 199. For example, table event processor 182 may publish the identity of one or more database tables at database 199, and these tables may be tables that a given consumer (e.g., applications 205A-D) has subscribed to receive database table update notifications. After the consumer is notified by resource planner including table event processor 182, the consumer may perform an operation, such as an SQL query directly 266B to database 199 or indirectly 266A via the resource planner to obtain the updated information from the changed database table.

In some implementations, the table event processor 182 may include an event broker 214 configured to read event notifications which may be provided via inbound push channel 218. The event notification may indicate that a database table at database 199 has an event corresponding to some type of change or other type of event that might trigger a consumer to query for the updated information in the database table. The event broker 214 may also read subscriptions from subscription manager 216 and subscription storage 220. As such, the event broker is able to know which consumers have subscribed to which database and publish via event notifier 212 and endpoints 206-208 the identity or list of database tables that have a changed.

The subscription manager 216 may manage the subscription storage 220, where a list of subscriptions is stored. The subscriptions include the identity or list of one or more database tables at database 199 and an indication of whether a consumer (and/or the identity of that consumer 205A-D or its endpoint 206-208) subscribes to the database table).

The in-memory database 199 may include a bus 292 such as an exchange bus that couples to the resource planner 180 (e.g., via the inbound push channel 218). The bus 282 may also couple to the notification handler 284 and the subscription manager 288.

When a consumer such as applications 205A-D seeks a subscription to a database table in order to receive an event notification of a database table change, resource planner 180 including table event processor 182 may subscribe to the database table events by at least providing to the subscription manager 288 a list of one or more database tables at database 199. The subscription manager 288 may manage the subscription storage 286, where a list of subscriptions is stored. The subscriptions can include the identity or list of one or more database tables at database 199 and an indication of whether a consumer subscribes (and/or the identity of that consumer 205A-D or its endpoint 206-208) to a given database table.

When a change to a table of database 199 occurs, table event handler 270 may send an event notification to notification handler 284. The table event handler 270 may read notifications and may read subscription information from subscription manager 286/288. As such, notification handler 284 is able to publish events indicating a list of one or more database tables that have had a change event. And, this push may publish the event be via bus 282 and notification channel 292B to resource planner 180 including table event processor 182 and push channel handler 218. The after commit handler 272 may handle operations after a commit by for example notifying the table event handler that data has been saved to a database table at application data 260.

The in-memory database 199 may, as noted, include a communication bus, such as exchange bus (XB) communication 282. This bus 282 is configured to allow other systems including consumers, services, and applications 205A-D to establish a connection 292A-B (e.g., a TCP/IP connection) in order to receive notifications of database table changes. For example, the table event processor 182 may establish at 292A a connection to the exchange bus 282, to subscribe via subscription manager 288 to table changes at in-memory database 199, while the in-memory database 199 can publish any database table changes via a notification channel 292B.

If consumers are interested in data changes of certain tables, the consumers may bind to a notification channel and subscribe to data changes via the event notifier 212. For example, consumers such as applications 205A-D may bind to a notification channel via a messaging channel at the event notifier 212. To subscribe to database table updates, the consumers may, via the messaging channel at the event notifier 212, provide the identity or list of the database tables for which consumers seek to subscribe to in order to be notified of updates. This can be provided to the subscription manager 216, which can store the subscriptions for each consumer at subscriptions 220. The table event processor 180 via the inbound channel 218 may open a connection to the exchange bus 282 (which may require authentication) and may then subscribe via the subscription manager 288 (which may store the subscriptions at 286) to the list of database tables for which resource planner 180 is interested in being notified of updates. The subscription manager 288 may also store the identity of the endpoint to enable the subscription manger 288 to send the notification of the update to the correct endpoint, such as the proper resource planner 180 if a plurality of planners/systems are coupled to the database 199 or the proper consumer. When a change occurs at a database table at database 199 that has a subscription, the table event handler 270 sends an event notification indicating the identity of the database table that has changes. The event handler 270 may reuse the connection to resource planner 180 (e.g., the connection established during the subscription process) or opens a new connection to the resource planner 180.

The push channel handler 218 may receive and processes change events sent by the database 199. In some implementations, the push channel may be implemented as an ABAP push channel (APC). As soon as events are received by the APC handler 218, the handler 218 may analyze the affected tables, get the subscription to them from the subscription store, and distribute the events via the data change notification channel. Consumers bound to this channel may receive the data change events including the names/identities of the affected tables. The notification channel may allow consumers to bind to the notification channels, which either receive the events via for example an ABAP session in an ABAP system itself or via other mechanisms including a socket (e.g., a web socket). In the case of a web socket, the database 199 may be able to push directly to a consumer, such as a UI application.

FIG. 3 depicts an example process 300 for handling database table events.

At 310, the table event processor 182 may receive a request from an application, such as applications 205A-B and/or the like, to subscribe to database table event(s) at in-memory database 199. The table event processor 182 may store, at 320, the subscription as noted above in subscription store 220 and may send a subscription request at 330 to subscribe to certain database table events at in-memory database 199 via for example 292A and bus 282. When an event occurs at the in-memory database 199, the table event processor 182 may receive an event notification from the in-memory database. The table event processor 182 may handle, at 340, the received notification on behalf of the application(s) in order to determine whether to publish the notification to an endpoint, such as the endpoint 206 and/or 208. The notification may indicate the identity of the database table(s) at the in-memory database that has been changed. At 350, the table event processor 182 may publish the notification to the endpoint(s).

To illustrate further, the table event processor 182 may receive request from one or more of the application to subscribe to a database table event at an in-memory database. As noted, the applications may be different types of applications. Moreover, by using an intermediary such as the table event processor 182, the in-memory database realizes a reduced processing burden, when compared to each application requesting individual change updates. The table event processor 182 may store at 220 a subscription to the database table event. The table event processor may store subscriptions to a plurality of database table events provided by a plurality of applications including different types of applications. The table event processor 182 may send a subscription request to the in-memory database 199. The subscription request may indicate the one or more subscriptions to the database table event. When a database table event occurs at the in-memory database, the table event processor 182 may receive a notification from the in-memory database. The table event processor 182 may handle the notification, which is received on behalf of the application. The table event processor 182 may determine whether to publish the notification to an endpoint coupled to at least the application. This notification may indicate an identity of at least one database table at the in-memory database that has changed. If an application has subscribed to the database table event or change, the table event processor 182 may then publish the notification to the endpoint. The publishing may include sending, by the event processor, a list of database tables that have changed at the in-memory database.

Moreover, the event processor may be included in a cloud-based application providing resource control. The resource control may include supply chain management and/or human resource management. The application may be included in a user equipment, which may be coupled to the cloud-based application.

In some implementations, the event processor may include an event broker configured to read the notification and read whether the notification includes the at least one database table under a subscription request from the application. When a change to the at least one database table is committed, an after commit handler at the database may trigger a database notification handler to determine whether the event processor subscribes, on behalf of the application, to the change. When the determination indicates the event processor subscribes, on behalf of the application, to the change, the database notification handler may send the notification to the event processor.

In some implementations, having a table event processor interfacing, and separate from, the database and the client application may (1) simplify implementation of the client applications and/or (2) may enable reduced processing burden on the in-memory database, which may enable fast database transaction processing times.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method comprising:
receiving, at an event processor, a request from an application to subscribe to a database table event at an in-memory database;
storing, at the event processor, a subscription to the database table event;
sending, by the event processor, a subscription request to the in-memory database, wherein the subscription request indicates a subscription to the database table event;
handling, at the event processor, a notification, wherein the notification is received on behalf of the application in order to determine whether to publish the notification to an endpoint coupled to at least the application, wherein the notification indicates an identity of at least one database table at the in-memory database that has changed; and
publishing the notification to the endpoint;
wherein
when a change to the at least one database table is committed, an after commit handler at the database triggers a database notification handler to determine whether the event processor subscribes, on behalf of the application, to the change;
when the determination indicates the event processor subscribes, on behalf of the application, to the change, the database notification handler sends the notification to the event processor.

2. The method of claim 1, wherein a cloud-based application providing resource control includes the event processor.

3. The method of claim 1, wherein the resource control includes supply chain management and/or human resource management.

4. The method of claim 2, wherein a user equipment includes the application and couples to the cloud-based application.

5. The method of claim 1 further comprising:
receiving, by the event processor, the notification sent by the in-memory database.

6. The method of claim 5, wherein the event processor includes an event broker configured to read the notification and read whether the notification includes the at least one database table under a subscription request from the application.

7. The method of claim 1, wherein the event processor stores subscriptions to a plurality of database table events provided by a plurality of applications including different types of applications.

8. The method of claim 1, wherein the publishing comprises sending, by the event processor, a list of database tables that have changed at the in-memory database.

9. A system including at least one processor and at least one memory including program code which when executed causes operations comprising:
receiving, at an event processor, a request from an application to subscribe to a database table event at an in-memory database;
storing, at the event processor, a subscription to the database table event;
sending, by the event processor, a subscription request to the in-memory database, wherein the subscription request indicates a subscription to the database table event;
handling, at the event processor, a notification, wherein the notification is received on behalf of the application in order to determine whether to publish the notification to an endpoint coupled to at least the application, wherein the notification indicates an identity of at least one database table at the in-memory database that has changed; and publishing the notification to the endpoint;

wherein when a change to the at least one database table is committed, an after commit handler at the database triggers a database notification handler to determine whether the event processor subscribes, on behalf of the application, to the change;

when the determination indicates the event processor subscribes, on behalf of the application, to the change, the database notification handler sends the notification to the event processor.

10. The system of claim 9, wherein a cloud-based application providing resource control includes the event processor.

11. The system of claim 9, wherein the resource control includes supply chain management and/or human resource management.

12. The system of claim 11, wherein a user equipment includes the application and couples to the cloud-based application.

13. The system of claim 9, further comprising:

receiving, by the event processor, the notification sent by the in-memory database.

14. The system of claim 13, wherein the event processor includes an event broker configured to read the notification and read whether the notification includes the at least one database table under a subscription request from the application.

15. The system of claim 9, wherein the event processor stores subscriptions to a plurality of database table events provided by a plurality of applications including different types of applications, and wherein the publishing comprises sending, by the event processor, a list of database tables that have changed at the in-memory database.

16. A non-transitory computer-readable storage medium including program code which when executed causes operations comprising:

receiving, at an event processor, a request from an application to subscribe to a database table event at an in-memory database;

storing, at the event processor, a subscription to the database table event;

sending, by the event processor, a subscription request to the in-memory database, wherein the subscription request indicates a subscription to the database table event;

handling, at the event processor, a notification, wherein the notification is received on behalf of the application in order to determine whether to publish the notification to an endpoint coupled to at least the application, wherein the notification indicates an identity of at least one database table at the in-memory database that has changed; and publishing the notification to the endpoint;

wherein when a change to the at least one database table is committed, an after commit handler at the database triggers a database notification handler to determine whether the event processor subscribes, on behalf of the application, to the change;

when the determination indicates the event processor subscribes, on behalf of the application, to the change, the database notification handler sends the notification to the event processor.

* * * * *